United States Patent
Knopf et al.

(10) Patent No.: US 11,399,541 B2
(45) Date of Patent: Aug. 2, 2022

(54) STORAGE-STABLE MICROBICIDAL CONCENTRATES AND USE THEREOF AS PRESERVATIVES

(71) Applicant: Vink Chemicals GmbH & Co. KG, Kakenstorf (DE)

(72) Inventors: Jennifer Knopf, Norderstedt (DE); Ralf Gradtke, Norderstedt (DE); Anne Gückel, Norderstedt (DE)

(73) Assignee: VINK CHEMICALS GMBH & CO. KG, Kakenstorf (DE)

( * ) Notice: Subject to any disclaimer, the term of this patent is extended or adjusted under 35 U.S.C. 154(b) by 249 days.

(21) Appl. No.: 16/610,197

(22) PCT Filed: Apr. 30, 2018

(86) PCT No.: PCT/EP2018/061038
§ 371 (c)(1),
(2) Date: Nov. 1, 2019

(87) PCT Pub. No.: WO2018/202624
PCT Pub. Date: Nov. 8, 2018

(65) Prior Publication Data
US 2021/0084901 A1     Mar. 25, 2021

(30) Foreign Application Priority Data

May 3, 2017 (EP) .................................. 17169189

(51) Int. Cl.
*A01N 43/00* (2006.01)
*A01N 43/80* (2006.01)
*A01N 33/04* (2006.01)
*A01N 39/00* (2006.01)

(52) U.S. Cl.
CPC ............. *A01N 43/80* (2013.01); *A01N 33/04* (2013.01); *A01N 39/00* (2013.01)

(58) Field of Classification Search
CPC ......... A01N 59/20; A01N 31/06; A01N 31/08
See application file for complete search history.

(56) References Cited

U.S. PATENT DOCUMENTS

| | | |
|---|---|---|
| 5,393,789 A | 2/1995 | Eggensperger et al. |
| 6,361,788 B1 | 3/2002 | Antoni-Zimmermann et al. |
| 7,045,542 B1 | 5/2006 | Beilfuss et al. |
| 7,368,466 B2 | 5/2008 | Beilfuss et al. |
| 8,592,358 B2 | 11/2013 | Beilfuss et al. |
| 8,765,657 B2 * | 7/2014 | Beilfuss ................. A01N 43/80 510/382 |
| 2006/0148873 A1 | 7/2006 | Beilfuss et al. |
| 2012/0189603 A1 | 7/2012 | Beilfuss et al. |

FOREIGN PATENT DOCUMENTS

| | | |
|---|---|---|
| DE | 40 33 272 | 10/1991 |
| DE | 1995 1328 | 5/2001 |
| DE | 10 2009 048189 | 4/2011 |
| EP | 0 551 975 | 7/1993 |
| EP | 0900525 | 3/1999 |
| EP | 1 005 271 | 6/2000 |
| WO | WO 2011/039090 | 4/2011 |
| WO | WO 2014/191096 | 12/2014 |
| WO | WO 2015/077209 | 5/2015 |

OTHER PUBLICATIONS

European Search Report, EP 17 16 9189, dated Jul. 12, 2017.
International Search Report, PCT/EP2018/061038, dated Jun. 5, 2018.
Written Opinion, PCT/EP2018/061038, dated Jun. 5, 2018.

* cited by examiner

*Primary Examiner* — Ali Soroush
*Assistant Examiner* — Danielle Sullivan
(74) *Attorney, Agent, or Firm* — Nixon & Vanderhye

(57) ABSTRACT

A chemical preservative including phenoxyethanol, 2-butyl-1,2-benzisothiazolin-3-one and N,N-bis(3-aminopropyl)dodecylamine; its use to inhibit and/or to control the growth of microorganisms in a technical composition.

20 Claims, No Drawings

STORAGE-STABLE MICROBICIDAL CONCENTRATES AND USE THEREOF AS PRESERVATIVES

The present invention relates to a new chemical preservative and to the use of this preservative to inhibit and/or to control the growth of microorganisms in technical and domestic products.

The prior art discloses a large number of active ingredients for the preservation of technical and domestic products. Inter alia, isothiazolin-3-ones (herein below isothiazolones) are used as preservation active ingredients.

European patent application publication EP 1 005 271 A1 discloses a mixture of 2-methylisothiazolone (methylisothiazolone, MIT) and 1,2-benzisothiazolone (BIT). However, such a mixture does not have an activity spectrum broad enough; the required use concentration is hence too high, or the product cannot be used for cost reasons.

German patent application publication DE 1995 1328 A1 discloses a preservative composition comprising carbendazim, at least one aromatic alcohol and/or at least one aromatic glycol ether and/or a pyrrolidon.

German patent application publication DE 10 2009 048189 A1 discloses a stable microbicidal concentrate comprising at least one isothiazolone, at least one alkyl amine having at least eight carbon atoms and at least one oxidizing medium.

International application publication WO 2014/191096 A1 discloses a) a microbicidal composition comprising 2-methyl-4-isothiazolin-3-one and b) an amine oxide which may also comprises another antimicrobial compound in a ratio of a) to b) is from 1:20 to 10:1, and its use of the composition for the preservation of technical and domestic products, preferred for the preservation of detergents and paints.

International application publication WO 2015/077209 A1 discloses a preservative composition includes a first biocide comprising an isothiazolinone, a second biocide comprising a pyrithione, and a biocide enhancing agent such as an amine having a carbon chain length of at least six carbon atoms.

German patent publication DE 40 33 272 discloses combinations of 3-benzoisothiazolinone (BIT) and of an organic amine such as bis(aminopropyl)dodecylamine.

In the context of the strengthening of environmental regulations especially in Europe, it is becoming increasingly difficult to prepare chemical preservatives of technical and household products which are: stable in the concentrate, labelling free in the application product (free of methylisothiazolinone) while having microbiological efficacy in order to be able to handle the end products free of germs.

This means that the preparation according to the invention must have a balanced spectrum of activity against bacteria, mould fungi and yeasts.

That is the reason why, the inventors developed a chemical preservative for use in paints, varnishes, dispersions and household products, free of formaldehyde, and methyl isothiazolinone, which is stable, in particular at low temperature, and has an improved effectiveness and a broader spectrum of action, thanks to a synergistic effect between its the components. They indeed found, that a combination of phenoxyethanol, N-butyl benzisothiazolin-3-one and N,N-bis(3-aminopropyl) dodecylamine fulfils the above criteria.

Therefore, the invention relates to a chemical preservative comprising:
- a)—phenoxyethanol,
- b)—N-butyl 1,2-benzisothiazolin-3-one and
- c)—N,N-bis(3-aminopropyl) dodecylamine, in which the weight ratio compound b) on compound a) (b/a) is superior or equal to ($\geq$) $10^{-3}$ and less than or equal to ($\leq$) $10^{-1}$, and the weight ratio compound c) on compound a) (c/a) is greater than or equal to $5\times10^{-4}$ and less than or equal to $6\times10^{-2}$.

The concentration of component a) in the chemical preservative as hereinbefore defined, expressed in percentage by weight of the composition, is generally from 85% to 99.85%, preferably from 93.5% to 99.4%, more preferably from 97.75% to 99%.

The concentration of component b) in the chemical preservative as hereinbefore defined, expressed in percentage by weight of the composition, is generally from 0.1% to 10%, preferably from 0.5% to 5%, more preferably from 0.75% to 1.25%.

The concentration of component c) in the chemical preservative as hereinbefore defined, expressed in percentage by weight of the composition, is generally from 0.05% to 5%, preferably from 0.1% to 1.5%, more preferably from 0.25% to 1.0%.

In the chemical preservative as hereinbefore defined, the weight ratio (b/a) is particularly superior or equal to $5\times10^{-3}$ and less than or equal to $5\times10^{-2}$ and the weight ratio (c/a) is particularly greater than or equal to $10^{-3}$ and less than or equal to $10^{-2}$; according to a more particular embodiment, the weight ratio (b/a) is greater than or equal to $8\times10^{-3}$ and less than or equal to $1.5\times10^{-2}$ and the weight ratio (c/a) is greater than or equal to $2.5\times10^{-3}$ and less than or equal to $5\times10^{-3}$.

According to a particular embodiment, the chemical preservative as hereinbefore defined also comprises:
- d) At least one solvent such as water, glycols, such as ethylene glycol, propyleneglycol, dipropyleneglycol, butanediols, glycol ethers, such as butyl glycol, butyl diglycol, polyols, such as glycerol, alkanediols and alkyl glycerol ethers, or a mixture thereof.

According to another particular embodiment, the chemical preservative as hereinbefore defined, also comprises:
- e) At least one additive such as a complexing agent, for example EDTA or NTA, a stabilizer, for example vitamin E, BHA or BHT, a corrosion inhibitor, for example benzotriazole or a mixture thereof.

According to another particular embodiment, the chemical preservative as hereinbefore defined, also comprises:
- f) At least one or more auxiliary, such as a surfactant, for example a wetting agent, a defoamer or a mixture thereof.

If the chemical preservative according to the invention comprises one more component d), e) and/or f), the total proportion of these components, expressed in percentage by weight of the composition, is less than 40% by weight, such as for example less than 10% by weight.

According to a more particular aspect, the chemical preservative as hereinbefore defined comprises at least a component d) and at least one component e).

According to another more particular aspect, the chemical preservative as hereinbefore defined comprises at least a component d) and at least one component f).

According to another more particular aspect, the chemical preservative as hereinbefore defined comprises at least a component e) and at least one component f).

According to the very specific aspect, the chemical preservative as hereinbefore defined comprises at least a component d), at least one component e) and at least one component f).

According to a preferable embodiment, the invention as hereinbefore defined, consists in components a) b) and c) and are free from components d), e) and f).

The chemical preservative as hereinbefore defined is preferably a clear and homogeneous composition and is preferably a liquid composition. It is adequately colour-stable, low-temperature-stable, storage-stable and active-ingredient-stable. Alternatively, it can also be a form of a low-viscosity to medium-viscosity composition which can flow or in the form of a semisolid, pasty composition.

The invention more particularly relates to a chemical preservative according to claim 5, comprising, as active ingredients:
- a)—From 97.75% by weight to 99% by weight of phenoxyethanol,
- b)—From 0.75% by weight to 1.25% by weight of N-butylbenzisothiazolin-3-one and
- c)—From 0.25% by weight to 1.0% by weight of N,N-bis(3-aminopropyl) dodecylamine.

The invention also relates to a process to inhibit and/or to control the growth of microorganisms in a technical composition, which comprises successive additions in said technical composition of efficient proportions of:
- a)—phenoxyethanol,
- b)—N-butyl 1,2-benzisothiazolin-3-one and
- c)—N,N-bis(3-aminopropyl) dodecylamine, in such quantities that the weight ratio compound b) on compound a) (b/a) is superior or equal to ($\geq$) $10^{-3}$ and less than or equal to $10^{-1}$, and the weight ratio compound c) on compound a) (c/a) is greater than or equal to $5\times10^{-4}$ and less than or equal to $6\times10^{-2}$, and in order that said technical composition finally contains for 100% of its weight, from 0.01% to 2.00% by weight of the chemical preservative as hereinbefore defined.

The invention also relates to a process to inhibit and/or to control the growth of microorganisms in a technical composition, which comprises adding the chemical preservative as hereinbefore defined, in order that said technical composition finally contains for 100% of its weight, from 0.01% to 2.00% by weight of said chemical preservative.

In the context of the invention a technical composition, generally means a water-based product such as a polymer dispersion, a paint, plasters, an adhesive, a sealing composition, a paper coating composition, a textile softening, a sizing composition, a washing raw material, a cleaning product, a domestic product, a surfactant, a polishing composition, a spinning bath, a cooling lubricant, a leather treatment composition, a silicone and bitumen emulsion or a concrete admixture.

In the context of the invention microorganisms generally mean, bacteria, yeast, moulds and fungi.

The invention also relates to the use of the chemical preservative as hereinbefore defined, to inhibit and/or to control the growth of microorganisms in a technical composition, and more particularly in a water-containing, water-dilutable or water dispersible technical composition or domestic products.

Experimental Part

Preparation of a Preservative According to the Invention (Composition 1)

A chemical preservative according to the invention was prepared by mixing its components together.

A clear, homogeneous, slightly yellowish, preparation is obtained, containing for 100% of its weight, 98.5% by weight of phenoxyethanol, 1.0% by weight of N-butylbenzisothiazolin-3-one and 0.5% by weight of N, N-bis(3-aminopropyl) dodecylamine (91% of active ingredient).

Germ Count Reduction Test

Dilutions of the samples are prepared with sterile tap water. 25 ml portions of the end solutions are inoculated with 0.1 ml microorganism suspension (initial microorganism count approx. $10^7$ cfu/ml) and stirred.

| Test organisms | ATCC/DSM-No. |
|---|---|
| Aspergillus brasiliensis | 16404 |
| Staphylococcus aureus | 6538 |

For the reduction test with *Staphylococcus aureus* the solutions are streaked out onto tryptone soya agar after 2,5,10 and 60 minutes.

For testing the reduction with *Aspergillus brasiliensis* the solutions are streaked out onto Sabouraud-dextrose 4% agar after 1, 3, 6 and 24 hours.

The cultures are incubated for 48 hours at 37° C., except for *Aspergillus brasiliensis*, which is incubated for 72 hours at 25-27° C. The evaluation is made on the basis of semi-quantitative assessment of the microbial growth of the streaks.

| Symbol | Finding | Germ count/ml |
|---|---|---|
| − | = no growth | <100 |
| + | = slight growth | approx. $10^2$ |
| ++ | = moderate growth | approx. $10^3$ |
| +++ | = heavy growth | approx. $10^4$ |
| ++++ | = massive growth | approx. $10^5$ |
| C | = surface covered | approx. $10^6$ |

Results

*Aspergillus brasiliensis* Germ Count Reduction Test

| | Contact time [h] | | | |
|---|---|---|---|---|
| Use-concentration [%] | 1 | 3 | 6 | 24 |
| Sterile hard water according to EN 14348 | C | C | C | C |
| +0.50% Composition 1 | ++ | + | − | − |
| +0.0025% N,N bis(3-aminopropyl)-dodecylamine | C | C | ++++ | ++++ |
| +0.0050% 2-butyl-1,2-benzisothiazolin-3-one | ++++ | ++++ | ++++ | ++++ |
| +0.50% phenoxyethanol | C | C | C | C |
| 0.50% phenoxyethanol + 0.0025% bis(3-aminopropyl)-dodecylamine | C | C | C | C |
| +0.50% phenoxyethanol + 0.0050% 2-butyl-1,2-benzisothiazolin-3-one | +++ | +++ | +++ | ++ |
| +0.0025% N,N-bis(3-aminopropyl)-dodecylamine + 0.0050% 2-butyl-1,2-benzisothiazolin-3-one | ++++ | ++++ | ++++ | ++++ |

*Staphylococcus aureus* Germ Count Reduction Test

| | Contact time [min] | | | |
|---|---|---|---|---|
| Use-concentration [%] | 2 | 5 | 10 | 60 |
| Sterile hard water according to EN 14348 | ++++ | ++++ | ++++ | ++++ |
| +0.50% Composition 1 | − | − | − | − |
| +0.0025% Bis-(3-Aminopropyl)-dodecylamine | +++ | ++ | ++ | − |
| +0.0050% 2-Butyl-1,2-benzisothiazolin-3-one | ++++ | ++++ | ++++ | +++ |
| +0.50% Phenoxyethanol | ++++ | ++++ | ++++ | ++++ |
| +0.50% Phenoxyethanol + 0.0025% Bis-(3-Aminopropyl)-dodecylamine | ++ | + | − | − |
| +0.50% Phenoxyethanol + 0.0050% 2-Butyl-1,2-benzisothiazolin-3-one | +++ | +++ | +++ | +++ |

-continued

| Use-concentration [%] | Contact time [min] | | | |
|---|---|---|---|---|
| | 2 | 5 | 10 | 60 |
| +0.0025% Bis-(3-Aminopropyl)-dodecylamine + 0.0050% 2-Butyl-1,2-benzisothiazolin-3-one | +++ | ++ | + | − |

These results show that the components of the composition 1 according to the invention, exhibit a synergistic effect against the tested germs. Such a synergy was not deductible from the prior art.

The invention claimed is:

1. A chemical preservative comprising:
   a) phenoxyethanol,
   b) 2-butyl-1,2-benzisothiazolin-3-one, and
   c) N,N-bis(3-aminopropyl) dodecylamine,
wherein the weight ratio of compound b) to compound a) (b/a) is greater than or equal to (>) $10^{-3}$ and less than or equal to $10^{-1}$, and the weight ratio of compound c) to compound a) (c/a) is greater than or equal to $5 \times 10^{-4}$ and less than or equal to $6 \times 10^{-2}$.

2. The chemical preservative according to claim 1, in which the concentration of component a) expressed in percentage by weight of the chemical preservative, is from 93.5% to 99.4%.

3. The chemical preservative according to claim 2, in which the concentration of component b) expressed in percentage by weight of the chemical preservative, is from 0.5% to 5%.

4. The chemical preservative according to claim 3, in which the concentration of component c), expressed in percentage by weight of the chemical preservative, is from 0.1% to 1.5%.

5. The chemical preservative according to claim 2, in which the concentration of component a) expressed in percentage by weight of the chemical preservative, is from 97.75% to 99%.

6. The chemical preservative according to claim 5, in which the concentration of component b) expressed in percentage by weight of the chemical preservative, is from 0.75% to 1.25%.

7. The chemical preservative according to claim 6, in which the concentration of component c), expressed in percentage by weight of the chemical preservative, is from 0.25% to 1.0%.

8. The chemical preservative according to claim 1, in which the weight ratio (b/a) is superior or equal to $5 \times 10^{-3}$ and less than or equal to $5 \times 10^{-2}$ and the weight ratio (c/a) is superior or equal to $10^{-3}$ and less than or equal to $10^{-2}$.

9. The chemical preservative according to claim 8, in which the weight ratio (b/a) is superior or equal to $8 \times 10^{-3}$ and less than or equal to $1.5 \times 10^{-2}$ and the weight ratio (c/a) is superior or equal to $2.5 \times 10^{-3}$ and less than or equal to $5 \times 10^{-3}$.

10. The chemical preservative according to claim 5, in which the concentration of component b) expressed in percentage by weight of the chemical preservative is from 0.75% to 1.25%, and the concentration of component c) expressed in percentage by weight of the chemical preservative is from 0.25% to 0.7%.

11. A process to inhibit and/or to control the growth of microorganisms in a water-based composition, which comprises successive additions in said water-based composition of:
   a) phenoxyethanol,
   b) 2-butyl-1,2-benzisothiazolin-3-one, and
   c) N,N-bis(3-aminopropyl) dodecylamine,
wherein the weight ratio of compound b) compound a) (b/a) is greater than or equal to (>) $10^{-3}$ and less than or equal to $10^{-1}$, and the weight ratio of compound c) to compound a) (c/a) is greater than or equal to $5 \times 10^{-4}$ and less than or equal to $6 \times 10^{-2}$, in order that said water-based composition finally contains for 100% of a weight of the water-based composition from 0.01% to 2.00% by weight of the chemical preservative according to claim 1.

12. A process to inhibit and/or to control the growth of microorganisms in a water-based composition, which comprises adding the chemical preservative according to claim 1, in order that said water-based composition finally contains for 100% of a weight of the water-based composition from 0.01% to 2.00% by weight of said chemical preservative.

13. The process according to claim 11, in which said water-based composition is a water-based product chosen from a polymer dispersions, a paint, plasters, an adhesive, a sealing composition, a paper coating composition, a textile softening, a sizing composition, a washing raw material, a cleaning and domestic product, a surfactant, a polishing composition, a spinning bath, a cooling lubricant, a leather treatment composition, a silicone and bitumen emulsion or a concrete admixture.

14. The chemical preservative according to claim 2, in which the weight ratio (b/a) is superior or equal to $5 \times 10^{-3}$ and less than or equal to $5 \times 10^{-2}$ and the weight ratio (c/a) is superior or equal to $10^{-3}$ and less than or equal to $10^{-2}$.

15. The chemical preservative according to claim 3, in which the weight ratio (b/a) is superior or equal to $5 \times 10^{-3}$ and less than or equal to $5 \times 10^{-2}$ and the weight ratio (c/a) is superior or equal to $10^{-3}$ and less than or equal to $10^{-2}$.

16. The chemical preservative according to claim 4, in which the weight ratio (b/a) is superior or equal to $5 \times 10^{-3}$ and less than or equal to $5 \times 10^{-2}$ and the weight ratio (c/a) is superior or equal to $10^{-3}$ and less than or equal to $10^{-2}$.

17. The chemical preservative according to claim 5, in which the weight ratio (b/a) is superior or equal to $5 \times 10^{-3}$ and less than or equal to $5 \times 10^{-2}$ and the weight ratio (c/a) is superior or equal to $10^{-3}$ and less than or equal to $10^{-2}$.

18. The chemical preservative according to claim 6, in which the weight ratio (b/a) is superior or equal to $5 \times 10^{-3}$ and less than or equal to $5 \times 10^{-2}$ and the weight ratio (c/a) is superior or equal to $10^{-3}$ and less than or equal to $10^{-2}$.

19. The chemical preservative according to claim 7, in which the weight ratio (b/a) is superior or equal to $5 \times 10^{-3}$ and less than or equal to $5 \times 10^{-2}$ and the weight ratio (c/a) is superior or equal to $10^{-3}$ and less than or equal to $10^{-2}$.

20. A process to inhibit and/or to control the growth of microorganisms in a water-based composition, which comprises successive additions in said water-based composition of:
   a) phenoxyethanol,
   b) 2-butyl-1,2-benzisothiazolin-3-one, and
   c) N,N-bis(3-aminopropyl) dodecylamine,
wherein the weight ratio of compound b) to compound a) (b/a) is greater than or equal to (>) $10^{-3}$ and less than or equal to $10^{-1}$, and the weight ratio of compound c) to compound a) (c/a) is greater than or equal to $5 \times 10^{-4}$ and less than or equal to $6 \times 10^{-2}$, in order that said water-based composition finally contains for 100% of a weight of the water-based composition from 0.01% to 2.00% by weight of the chemical preservative according to claim 2.

* * * * *